United States Patent [19]

Mehnert

[11] 4,445,087

[45] Apr. 24, 1984

[54] PROCESS AND AN APPARATUS FOR MEASURING THE ANGULAR VELOCITY OF A ROTATING MEMBER

[76] Inventor: Walter Mehnert, Grillparzerstr. 6, D-8012 Ottobrunn, Fed. Rep. of Germany

[21] Appl. No.: 259,554

[22] Filed: May 1, 1981

[30] Foreign Application Priority Data

May 14, 1980 [DE] Fed. Rep. of Germany ....... 3018528

[51] Int. Cl.³ .............................................. G01P 3/36
[52] U.S. Cl. ..................................... 324/175; 324/176
[58] Field of Search ................ 324/175, 163, 176, 392

[56] References Cited

U.S. PATENT DOCUMENTS

| 3,631,443 | 12/1971 | Halfhill et al. | 324/175 X |
| 3,691,440 | 9/1972 | Haddock | 324/175 X |
| 3,735,260 | 5/1973 | Hartline et al. | 324/175 |

FOREIGN PATENT DOCUMENTS 533976 11/1976 U.S.S.R. .............................. 324/175

OTHER PUBLICATIONS

Thomas, Jr., Velocity Measuring Device, IBM Technical Disclosure Bull., Dec. 1971, p. 2116.
Wang, Determining Velocity, Stress, And Strain of Moving Tape, IBM Technical Disclosure Bull., Dec. 1960, pp. 12-14.

Primary Examiner—Stanley T. Krawczewicz

[57] ABSTRACT

The instantaneous angular velocity of a rotating shaft or the like is translated from the relative rotation of a mark carrier, having a scale of marks, and a sensing device. A series of signals are produced and processed in a calibrating run and thereafter in a series of operating runs. In the calibrating run, the time distance of the sensed signals between at least one pair of the marks is measured and from it a calibrating value is calculated corresponding to the absolute angular distance between the marks and thereafter stored. During the operation runs, the instantaneous time distance of the sensed signals between the marks is measured and the instantaneous velocity is obtained by comparing it with the stored calibrating value.

53 Claims, 6 Drawing Figures

PROCESS AND AN APPARATUS FOR MEASURING THE ANGULAR VELOCITY OF A ROTATING MEMBER

FIELD OF THE INVENTION

This invention concerns a process and an apparatus for measuring the angular velocity of a rotating member.

DESCRIPTION OF THE PRIOR ART

In a known process and known apparatus of this kind, the relative rotation between the mark carrier and the sensing unit is effected when the mark carrier, such as a flat circular disc, is connected rigidly to the rotating member such that the axis of rotation of the latter member extends through the centre or midpoint of the disc.

In order to measure the angular velocity of the rotating member with high resolution, i.e. to be able to determine and measure the changes or variations of the angular velocity occurring during one revolution, a plurality of marks, spaced apart in the direction of rotation and in the form of radially extending lines are attached to the disc. The lines have a degree of light permeability different from the surrounding portions of the disc so that a fixed electro-optical sensor, belonging to the sensing unit, always emits an electric signal when the brightness of an impinging beam of light, coming from a light source arranged on the other side of the disc, is modified by the passing of such a line. Then, information concerning the instantaneous angular velocity of the rotating member is derived by means of an electronic measuring and evaluating circuit from the sequence of pulse-shaped electric signals thus obtained.

The measuring accuracy of this known method is dependent upon the precision with which the lines are arranged on the mark carrier, in which case the following individual factors are of particular importance in the general term "precision": the individual lines or marks must be as narrow as possible in the direction of rotation and must exhibit border edges which extend as parallel to one another as possible; moreover, they must extend as radially as possible and must be as identical as possible to one another. Furthermore, the angular distances of the lines or marks, i.e. the angle enclosed by the marks with respect to the axis of rotation, must coincide with a high degree of accuracy. It is not only sufficient that the mark carrier, which is used in the known process, has these properties only at, or immediately after its manufacture, critical standards for the accuracy of size stability and in particular of the temperature stability of the material used for manufacturing such a mark carrier must be maintained.

Therefore, in accordance with the state of the art, special glass discs have been used as a mark carrier, into which the necessary number of marks in the form of very accurately positioned and extremely narrow lines are engraved or etched by means of a very laboursome and expensive process. In this case it is typical for the thickness of the lines to be approximately equal to the distance between successive lines, this being often in the magnitude of approximately 10µ. Consequently a very unfavourable signal to noise ratio results giving rise to the need for very expensive electronic circuiting in order to extract the wanted signals assigned to the individual marks from the very noisy sensor output signal for the purpose of further processing. Moreover, the maximum attainable measuring accuracy is negatively affected by this poor signal to noise ratio.

The high manufacturing costs resulting from the aforesaid problems restricted the use of mark carriers and the evaluating electronic systems, having a highly accurate angular velocity or rotational speed measurement with a high degree of resolution capability were only used in those small number of cases in which the use of a measuring apparatus with such a high manufacturing cost was economically justified.

SUMMARY OF THE INVENTION

It is therefore the object of the invention to provide a process and an apparatus of the kind mentioned at the outset which permits highly accurate and, if desired, highly resolving angular velocity measurement, in which use is made of a simple mark carrier which is inexpensive to manufacture.

In accordance with the invention this object is solved.

Thus, the starting point of the invention is a mark or scale carrier on which a desired number of marks are disposed and approximately equally distributed along the path swept over by the sensor of the sensing unit, without in so doing having to go to particular expenditure with respect to an extremely accurate angular positioning of these marks. Nevertheless, the respective angular velocity of the relative rotation, and thus of the rotating member, can be extremely accurately determined in that the distance relative to time of two electric signals produced by the sensor is measured, with regard to two identified marks. If it is known which marks the respective electric pulse signals are assigned to, the accuracy of the angular velocity measurement then depends only on the accuracy of the instantaneously effected time measurement and the accuracy with which the angular distance of these two marks are known. The time distances between two subsequent electric signals can be electronically measured with high accuracy without high technical and cost expenditure, for example by means of a quarz-controlled oscillator circuit. Since, the absolute value of the angular distance of the two marks in question has been previously determined in a calibrating run, also by means of a correspondingly accurate time measurement, and has been stored in the form of a calibrating value, the instantaneous angular velocity is obtained with the accuracy of the time measurement used by means of a simple calculation comparison of the stored calibrating value with the instantaneously measured time distance.

If, by way of example, the angular velocity $\omega_E$ and the time distance $\Delta T_E$ was measured in the calibrating run between the two identified electric pulse signals, i.e. signals belonging to marks which can be again recognised, and if a time distance $\Delta T(t)$ results at the time t between the electric signals assigned to the same marks, then the following is true:

$$\omega(t) = \frac{\Delta T_E}{\Delta T(t)} \omega_E.$$

Therefore, in order to determine the instantaneous angular velocity $\omega(t)$ from the stored calibrating values and the instantaneous measuring value $\Delta T(t)$, all that is required is a simple calculating operation which can be carried out electronically without any further problem and at low technical expenditure.

The accuracy with which the angular distances of the different marks on the mark carrier coincide, is not contained in the measurement so that in the present process mark carriers can be used which have been manufactured with little expenditure and which are therefore extremely cheap.

In order to be able to assign the time distances, measured instantaneously during the measuring runs, to the correct calibrating values, it is necessary to identify the marks belonging to the signals emitted by the sensor. This identification is preferably effected by means of the asymmetries present in the scale formed by the marks on the mark carrier.

In the present method, these asymmetries usually result quite automatically in that it is always possible by means of a correspondingly accurate time measuring method to determine the angular distances between the marks, and in particular between directly subsequent marks, with such high accuracy that no two measuring values, which correspond with each other for a given angular velocity, exist on the whole scale. This is true even if the mark carrier is manufactured with much higher precision as regards the positioning of the individual marks than is intended and necessary in the present process. Thus, preferably, the angular distances of the marks directly following each other on the mark carrier in the direction of rotation, which distances are not absolutely identical, serve as the asymmetries which are used for identifying the individual marks.

It is thus possible to identify as individual marks each of the marks by means of their respective angular distance from the immediately preceeding mark and/or from the immediately following mark, or also by means of the angular distances from two or more preceeding marks, when, first of all, all angular distances of all respective marks following each other directly in the direction of rotation are measured and stored.

If, for example, a certain function is to be triggered when the n-th mark passes the sensor, this triggering can be effected when the first sensor signal occurs after the reappearance of the known angular distance between the (n−1)-th and the (n−2)-th mark, which occurs only once on the mark carrier, has been identified.

Since, in accordance with the present process, the angular distance of two marks is measured over the time distance of the corresponding sensor signals and since the instantaneous angular velocity is included in this measurement, it is advisable in order to identify the n-th mark, to use the quotient of, for instance, the time distances characterising the angular distances of the (n−1)-th to the (n−2)-th and the (n−2)-th to the (n−3)-th mark. In the case of this quotient formation, the instantaneous angular velocity falls out if during the period of time comprising these two directly subsequent time distances, the rotational or angular velocity is constant. Thus this requirement will be generally fulfilled due to the shortness of this period. Further, the probability that various mark groups will be present on a mark carrier, for which the quotient formed in the aforesaid manner exhibits equal values within the scope of the highly accurate time measurement used, is again substantially smaller than the probability that two exactly identical angular distances between subsequent marks will randomly occur.

In accordance with the invention it is not important to identify all marks individually in the manner described. Instead, it is advantageous to identify only some, preferably only one single mark, which then serves as zero mark when identifying the remaining marks by counting the corresponding sensor signals.

It is expressly pointed out that, in the most general case, it is not even necessary to determine this zero mark previously and finally as such, when manufacturing the mark carrier. Instead, anyone of the marks present on the mark carrier can be randomly picked and used in the following measurement period as the zero mark during the operation of a measuring device operating in accordance with the inventive process.

For instance, any mark can be picked as the zero mark, using as the criterion a system wherein the counter for periodic counting of the marks, i.e. counting which starts again from the beginning upon each new revolution, is always reset to zero by the mark which follows the shortest or the longest angular distance present on the mark carrier between two directly adjacent marks. As explained above, however, it is not preferable that the time distances of immediately subsequent marks be used for eliminating the rotational speed dependency. However, since the quotients of time distances of two such mark pairs are compared with each other, the aforesaid criterion has the drawback that the time distance of one and the same mark pair must be used as the denominator of all quotients to be formed during one revolution, while the numerators are formed from the time distances of the mark pairs brushed over one after the other. This would mean, however, that the thus defined zero mark can only be found when the speed of rotation remains constant at least during one complete revolution. Therefore, the zero mark is preferably defined by the last of the three immediately subsequent marks whose two time distances result in the smallest or, alternatively, the largest quotient.

For the purpose of simplification, it is, however, also possible, instead of, or in addition to the "naturally" present asymmetries in the scale on the mark carrier formed by the marks, to use "intentionally" produced asymmetries for identifying at least the zero mark. Thus it can be provided for example that one of the marks is determined as the zero mark when its angular distance to one of its directly adjacent marks substantially differs from the angular distances of all other marks which are immediately adjacent to one another, or that it substantially differs in its length and/or width from the length and/or width of the remaining marks.

In the aforesaid considerations it was assumed that the angular velocity $\omega_E$ is known for the calibration run. The knowledge of this angular velocity $\omega_E$ need, however, not come from an external source as for example from (which is possible in principle) the relative rotation between mark carrier and sensing device created during the calibrating run by a motor having a constant known speed of rotation, instead of by the rotating shaft member. Instead it is possible to determine the value of $\omega_E$ in the present process by means of the apparatus, during the calibrating run, itself. For this purpose, the invention provides that two different kinds of time distances are measured and passed on for further processing. One of these kinds of time distances are so-called "mark pair time distances", i.e. the time distances of electric pulse signals already mentioned several times, which belong to one mark pair formed by two different marks disposed after each other on the mark carrier in the direction of the relative rotation. On the other hand, the second type of time distances are so-called "mark inherent time distances", i.e. the time distances of electric signals which are each assigned to one and the same mark on the mark carrier. If the sensing unit of the inventive apparatus comprises only one sensor, the inherent time distances of each mark correspond exactly to an angle of rotation of 360°, so that the reciprocal value of these inherent time distances indicates the angular velocity $\omega_E$, existing during the calibrating run, with the accuracy of the time measurement used—this value, however, taken as a mean of the values for one complete revolution. Thus, in order to be able to use the mark pair time distances, which are measured simultaneously during such a calibrating run, as calibrating values for later measuring runs, the requirement must be fulfilled that the angular velocity $\omega_E$ is constant during the calibrating run.

Before explaining in detail in the following how this constancy of the angular velocity $\omega_E$ is ensured during the calibrating run, it is pointed out that the aforesaid mark pairs may be formed from directly subsequent marks on the mark carrier in the direction of the relative rotation. However, in an embodiment of the present process, each of the mark pairs may also comprise as a first mark a zero mark common to all mark pairs, and, as a second mark, an individual mark for this pair. This latter zero mark may be identical to the above-described zero mark defining the periodic re-start of the mark count. In this case the first mark pair then comprises the zero and the first mark, the second mark pair comprises the zero and the second mark, the third mark pair comprises the zero and the third mark, etc.

The constancy of the angular velocity $\omega_E$ during a calibrating run can now be determined in accordance with two different preferred measuring, comprising and storing methods.

In one embodiment, it is provided that the mark pair time distances be measured and stored intermediately during the calibrating run in a multiple of series of measurements beginning one after the other and in each case for a multiple of mark pairs, that the mark inherent time distances are measured and stored intermediately for a multiple of individual marks, that the mark pair time distances forming one series of measurements are compared singly with the corresponding mark pair time distances of the previous series of measurements, and that then, if this comparison results in coincidence within prescribed tolerance limits, the mark pair time distances are stored for a longer period as calibrating values, while the mean value is calculated from the mark inherent time distances and stored and processed further as a measure for the angular velocity present at this time.

If the sensing apparatus used in this case comprises only one sensor, the aforesaid series of measurements are identical to a complete relative rotation. The mark pair time distances of a multiple, preferably of all mark pairs present on the mark carrier and identified in the above sense are thus measured in the case of at least two subsequent revolutions. The values of the first complete revolution are stored intermediately and are in each case individually compared, preferably by quotient formation, with the mark pair time distance obtained for the corresponding pair of marks during the second revolution. If it turns out that the compared values coincide within prescribed tolerance limits, this is an indication of the fact that the angular velocity $\omega_E$ has been constant within the prescribed tolerance limits at least during these two revolutions, and that either the mark pair time distances themselves or time values derived from them, which characterise the absolute values of the angular distances of marks immediately succeeding on the mark carrier, can be stored for a longer period as calibrating values. From the mark inherent time distances, which were simultaneously measured and stored during these two revolutions, from a multiple, and preferably of all of the marks present on the mark carrier, then is formed the mean value whose reciprocal value is stored for a longer period as a measure for the angular velocity $\omega_E$ which prevailed during the calibrating run and which has been checked with respect to its constancy.

If the sensing apparatus used comprises two sensors, which, by way of example, are arranged diametrically opposite each other with respect to the rotational axis of the relative rotation, the aforesaid calibrating method is carried out in the corresponding manner with the difference that the series of measurements, at least two of which are to be formed, do not each correspond to a complete revolution but only to a half revolution, and the mark inherent time distances between the electric signals are measured, which one and the same mark produces, first of all at the one and then at the other of the two sensors. The advantage of this arrangement is seen in the fact that the constancy of the angular velocity $\omega_E$ need only be present for a substantially shorter period for carrying out a calibrating run. In order to avoid errors when measuring the inherent time distances, the angular distance between the two sensors must be known very accurately, but it is always possible by means of the inventive construction to continuously re-measure this angular distance so that even here no particular demands need be made on long-term constancy.

Alternatively, it is also possible to measure the mark pair time distances by means of two sensors and to compare the two series of measurements obtained during one revolution. But then the mark inherent time distances are measured only by means of the electric signals occurring at one sensor and each being derived from the same mark.

In the case of a further preferred measuring process, which may also be carried out with one, two or more sensors, the mark inherent time distances are measured for a multiple of individual marks. These measurements are stored intermediately and compared with each other and the mark pair time distances for a multiple of mark pairs are simultaneously measured. Then, if the comparison of the mark inherent time distances results in coincidence within prescribed tolerance limits, the mark pair time distances are stored for a longer period as calibrating values. Meanwhile, the mean value is formed from the mark inherent time distances and it is stored as a measure for the angular velocity prevailing at this time and is processed further. The most important difference over the previously explained process is thus seen in that it is not the mark pair time distances but the mark inherent time distances which are used to check the constancy of the angular velocity $\omega_E$.

From the above explanation of the various possibilities within the scope of the present process for carrying out the calibrating run it results that the angular velocity of the relative rotation between mark carrier and sensing apparatus must be constant for a certain period of time, although it can have any value since this value is also determined from the measuring results obtained during the calibrating run.

Thus, as mentioned above, it is in principle possible to calibrate the inventive apparatus by connecting it, first of all not to the member to be monitored but to a motor with constant speed of rotation and thus carry out the calibrating run. However, this has the drawback that high demands are made on the long-term constancy of the complete device and in particular on the mark carrier, or that relatively laboursome recalibrations have to be carried out over and again. This goes to increase the manufacturing and operating costs.

Thus, in accordance with a particularly preferred embodiment of the process, it is provided that the relative rotation between mark carrier and sensing device is carried out by means of the rotation of the rotating member during the calibrating run. The apparatus can thus be attached without being calibrated to the rotating member, whose angular velocity is to be continuously measured and monitored, and this rotating member is then set in operational rotation. Since, in order to carry out a complete calibration as explained above, and depending on the embodiment example of the sensing means, no more than two, and under certain circumstances even only one, or, in the case of even more sensors, even less than one revolution is necessary. It can be assumed in each case that the rotating member has a constant angular velocity sometime for such a short period of time, even shortly after it starts to operate. The apparatus operates during the complete initial period and checks continuously whether time distances belonging to one another coincide within the prescribed tolerance limits. As soon as the rotating member has a constant angular velocity, even if only for a short time, the inventive apparatus identifies this constancy and processes the values obtained during this period for determining calibrating values and storing them for a longer period. These calibrating values are then used during the subsequent measuring runs for very highly accurate measurement and calculation of the instantaneous angular velocity of the rotating member.

Absolutely no further demands need be made on the long-term constancy of the complete arrangement, including the mark carrier. The present process provides that the calibrating run is constantly repeated for continuous recalibration. Since measuring values concerning the instantaneous angular velocity of the rotating member constantly appear in a calibrating run, it is provided in accordance with a particularly preferred embodiment that, in the case of each measuring run, mark pair time distances and mark inherent time distances are measured and are compared in the manner of the calibrating run. The measuring run is always treated as a new calibrating run if the comparison shows that the values coincide within the prescribed tolerance limits. In this embodiment, the sharp separation between calibrating run and measuring run is abandoned. Instead, all measuring values which are necessary for continuous recalibration of the inventive apparatus are continuously obtained and further processed in the appropriate manner. This is absolutely no problem because of the speed of the electronic measuring and evaluating circuit. If the angular velocity of the rotating member changes during a randomly selected period, the apparatus identifies this and indicates only the instantaneously measured angular velocity without making any changes in the stored calibrating values. However, as soon as a new constant angular velocity of the rotating member comes into being, it is immediately identified and a recalibration is carried out immediately. Since, as already mentioned, such a calibrating run takes only a very short time, it can be assumed that, in the case of nearly all practical applications, the periods, in which the angular velocity of the rotating member has the constancy necessary for carrying out a calibrating run, arise substantially more often and are longer than the periods in which the angular velocity changes. For this reason, only the time measuring apparatus must have good long-term constancy in the case of the inventive apparatus. This can be achieved with the known means and without any great expenditure. All other parts of the present arrangement may exhibit medium and long-term drift occurrances which are calibrated out over and again by means of the present process.

As already mentioned several times, sensing means comprising one, two or more sensors may be used in the process. In a preferred embodiment it is provided that the sensing apparatus comprises two sensors which are spaced an angular distance apart with respect to the rotational axis of the relative rotation and which are arranged preferably diametrically opposite each other. With such an arrangement it is possible to identify precession movements of the rotational axis of the relative rotation within one revolution, since such movement produces angular velocity values which appear to be enlarged at one of the sensors and appear to be reduced by the same amount at the other sensor. The measuring and evaluating circuit is so advantageously modified in such cases that it measures mark pair time distances at both sensors simultaneously and compares these not only with the corresponding stored calibrating values, but also examines them as regards whether the deviations from the respective calibrating values have opposite signs and are of the same absolute magnitude. If the latter is the case, the real angular velocity, which is freed from the errors caused by the precession movement, can also be determined and indicated. It is possible in accordance with the invention to identify precession movements, even if the sensing means comprises only one sensor. In this case, however, several revolutions are necessary and the measuring and evaluating device must store and compare the time distance values obtained for the individual identified pairs of marks.

By means of the present process, highly accurate and highly resolved angular velocity measurements can be carried out with one sensor, even if either the rotating member itself or the measuring construction is out of true, i.e. runs eccentrically. The effects of such eccentric running are eliminated by the continuous recalibration or new calibration of the system; by means of long-term comparison, the extent of the error can be measured in addition, and thus an indication of possible critical situations can be obtained so that timely warning can be given before the eccentricity becomes so strong that it leads to damage or even destruction of the rotating arrangement.

As already explained, the mark pair time distances of all mark pairs present on the mark carrier are measured, stored and evaluated in accordance with a preferred embodiment of the invention. It is advantageous to carry out these measurements such that the end point as to time of each individual measurement is identical to the starting point as to time of the immediately subsequent individual measurement. In this case, the mark inherent time distances need no longer be measured separately; instead, it is possible to determine them by adding up the mark pair time distances of all mark pairs formed by marks which are respectively directly adjacent. Since the starting and end points as to time of the individual measurements used in this case always coincide exactly in each case, the errors of the individual measurements do not add up and a value is obtained for the mark inherent time distances which only bears an error corresponding to the accuracy of an individual mark pair time distance measurement.

Furthermore, a possibility exists in this case to check the correct functioning of the measuring and evaluating circuit in that the mark inherent time distances are an extra measurement and these measuring results are compared with the sum of the corresponding mark pair time distances. If the apparatus functions correctly, coinciding values will result.

The exact coincidence of end and starting points of immediately subsequent measurements of mark pair time distances can be achieved advantageously since, for the mark inherent time distance measurement of a randomly selected mark, a steady continuing time measurement is triggered by the sensor signal assigned to this mark. In the case of each subsequent sensor signal, the time measuring value attained is determined without the continuous time measurement being interrupted and is further processed.

The addition of the time distances of the directly subsequent measurements of mark pair time distances can be carried out advantageously, since for the mark inherent time distance measurement of a randomly selected mark, a constantly continuing time measurement is triggered by the sensor signal assigned to this mark. In the case of each subsequent sensor signal, the time measuring value attained is determined, without the continuing time measurement being interrupted, and is further processed.

The addition of the time distances of mark pairs formed by directly subsequent marks is carried out in this case, not by calculation but by the measurement itself. The determination of the mark pair time distances is carried out by subtraction of time measuring values obtained directly after each other in each case.

A particularly preferred embodiment is characterised in that the measurement of a time distance between two respective sensor signals is carried out by counting the oscillation periods of a free-running, preferably quarz-controlled oscillator, occurring between these sensor signals.

In order to avoid having to use an oscillator, oscillating with an extremely high frequency, in the case of high rotational speeds and a large number of marks for obtaining the necessary accuracy, it is preferable to provide that the position, as to time, of a sensor signal within the respective oscillation period of the oscillator be measured by means of a time-amplitude converter circuit, which upon being triggered by means of a start signal produces an output signal which increases in its amplitude continuously and monotonically in time. This is thus a measure for the time which has elapsed since the start signal. Thus the smallest time unit of a complete or half oscillator period, which cannot be further subdivided in the case of pure counting of the oscillator oscillations, can be further resolved, this leads to substantially enhanced measuring accuracy, above all in cases in which only a few periods of the free-oscillating oscillator occur between two subsequent sensor signals.

It is particularly advantageous that the time-amplitude converter circuit be started by the earlier sensor signal for measuring the time distance between two sensor signals. The circuit is stopped by a subsequent zero crossover of the oscillator oscillation and is reset after storing of the output signal amplitude thus obtained as a first precision time measuring value. The time-amplitude converter circuit is again started by the later sensor signal and, it is stopped by a subsequent zero crossover of the oscillator oscillation, being reset upon storing the output signal amplitude thus obtained as a second precision time measurement. To obtain an approximate time measuring value, the number of oscillator oscillations taking place between the two zero crossovers is multiplied by the reciprocal value of the oscillator frequency. To determine the time distance of the sensor signals, the first precision time value is added to the approximate time value and the second precision time measurement is subtracted from their sum. If the oscillator periods between two sensor signals are measured by counting the oscillator half periods occurring in this period of time, then it is preferably provided that the first zero crossover of the oscillator oscillation after the sensor signal is used for stopping the time-amplitude converter circuit.

If, on the other hand, only complete oscillator periods are counted, the first zero crossover of the oscillator oscillation occurring in a prescribed direction after the sensor signal is used to stop the time-amplitude converter circuit.

In this method, three time measurements are therefore carried out for determining an individual mark pair time distance, and their results are combined with one another, correct as to sign. In the case of the above-described continuing time measurement, which proceeds from a defined mark, the only number of oscillator periods occurring between two sensor signals, which is required for determining the approximate time value, is not directly measured but is determined by subtracting the two counting values belonging to the above-mentioned zero crossovers.

Since the ordinary time-amplitude converter circuits may have drift occurrances over long periods, in which case the output amplitude, which is attained in each case within certain lengths of time after the start signal changes, a particularly preferred embodiment provides that the time-amplitude converter circuit is recalibrated over and again between the time distance measurements. It is started by a zero crossover of the oscillator oscillation and stopped by a subsequent zero crossover of the oscillator oscillation. The time measuring value of the time-amplitude converter circuit thus obtained is compared with the period of time between these two zero crossovers of the oscillator oscillation.

It has already been explained hereinbefore that the accuracy and long-term constancy of the inventive angular velocity measuring method depends only on the accuracy and long-term constancy of the time measuring method used for measuring the angular distance of interest. Due to the fact that the time-amplitude converter circuit, which by no means has the long-term constancy of a quarz, is continuously recalibrated by means of the quarz, even in the case of the combined time measurement which resolves as to time the oscillation periods of the quarz-controlled oscillator, the complete angular velocity measuring method receives the same accuracy and long-term constancy as the quarz without any particular demands having to be made on the remaining parts of the inventive apparatus in this respect. Since quarz is available at low cost, which oscillate very accurately even over long periods, the invention provides an extremely low-price and nevertheless extremely accurate angular measuring device.

Ordinary commercial time-amplitude converter circuits have the further property that the amplitude of their output signal increases linearly in time only after a certain initial period after each start signal, whereas a more or less strong degree of non-linearity is present immediately after the start signal. Since the free-running oscillator is synchronised in no way with the sensor signals, it is quite possible that such a short period lies between the sensor signal starting the time-amplitude converter circuit and the subsequent zero crossover of the oscillator oscillation used for stopping the time-amplitude converter circuit, that the time-amplitude converter circuit operates in the non-linear range, which may lead to falsification of the precision time value thus obtained.

In order to achieve results which are more accurate and which can be reproduced better, the invention provides that the time-amplitude converter circuit be stopped by the corresponding zero crossover of the oscillator oscillation at every time distance measurement and at every calibration measurement with a predetermined time delay. The time-amplitude converter circuit is started after each of these measurements by a start signal produced within the circuit and is again stopped by a stop signal which is produced at the same time as this start signal and which is also subjected to said predetermined time delay. The correction value thus obtained is subtracted from the previously obtained time measuring value.

Thus, through these measures, the period of time, during which the time-amplitude converter circuit operates at each precision time measurement and also at each calibrating measurement, is extended by a predetermined period which is selected such that it is definitely larger than the period during which the amplitude of the output signal of the time-amplitude converter circuit increases non-linearily. Immediately after the measuring value thus obtained has been stored immediately, the time amplitude converter circuit is set back to its initial state and is then restarted by an internally produced start signal. A stop signal is also produced simultaneously along with this start signal and is passed on to the time-amplitude converter circuit along the same path on which the latter receives the stop signal derived from the zero crossover of the oscillator oscillation during the actual time measurements.

This stop signal produced simultaneously along with the internally produced start signal, also undergoes the above-mentioned delay, so that the time-amplitude converter circuit operates, despite the simultaneous production of both signals, for a period which corresponds to this delay (and possibly to transit time differences present between the start and stop lines and also present in the same manner during the actual time measurement). Thus, a correction value is produced by means of which the transit time differences and non-linearities contained in the time measurement performed just previously are determined. This correction value is subtracted from the precision time measurement or calibrating measurement still present in intermediate storage. The difference is a measurement like the one which would be obtained with a time-amplitude converter circuit controlled without transit time differences and operating linearly in an ideal manner, and it is thus ideally suitable for further processing. Since the correction values are always obtained immediately after the measurement to be corrected, the influence of long-term drifts possibly arising at this point are eliminated.

Use is preferably made of an oscillator with a rectangular-shaped output signal in the case of which the crossovers of the edges of the pulses through a given voltage level take the place of the zero crossovers of the oscillator oscillations.

In accordance with a particularly preferred embodiment it is further provided that ideal marks are abstracted by each sensor of the sensing unit from the real marks disposed on the mark carrier and that the time distances of these ideal marks are measured. The result of this is not only that no particular demands need be made on the long-term dimensional accuracy of the material used for manufacturing the mark carrier nor on the accuracy of the angular positioning of the marks disposed on the mark carrier, but also that the width and the concrete geometric shape of these marks and the accuracy of their radial extension no longer plays any vital role influencing the accuracy of the angular velocity measurement.

In this case it is of particular importance that the widths of the real marks viewed in the direction of rotation can be selected to be substantially larger than was possible in accordance with the state of the art, without the measuring accuracy of the process being thereby affected in any way whatsoever. In fact the signal to noise ratio at the output of the sensor can be improved considerably by the greater width of the marks, whereby, on the one hand, the circuit expenditure necessary for processing the wanted signals can be considerably reduced and, on the other hand, the measuring accuracy can be enhanced even more.

The abstraction of the ideal marks from the real marks is carried out advantageously in that the crossover of an electric signal through a given constant voltage level, said signal being derived from the signal emitted by the sensor when a mark passes it, serves as an ideal mark. Preferably a differential photo receiver is used in each case as sensor, having at least one subtracting member connected downstream thereof, and the zero crossover of the output signal, which is produced by the subtracting member when a mark passes the differential photo receiver, serves as an ideal mark.

A differential photo diode can be used as differential photo receiver whose photo-sensitive surface is subdivided into two halves or four quadrants by one or two separating ridges, respectively.

In the first case the photo diode is arranged such that its separating ridge runs approximately radially with respect to the axis of the relative rotation. For processing the signals only one subtracting member, preferably a differential amplifier, is connected downstream of the photo diode. The two inputs of the amplifier are each connected to one of the two halves of the photo-sensitive surface. When each mark passes, the subtracting member emits one output signal in each case whose zero crossover defines a kind of "optical centroidal axis" of the real marks in a manner which can be exactly reproduced at least for a short period, and which is thus excellently suitable as an ideal mark which is practically "punctiform" with respect to time. It is possible that the "mark centroidal axes" thus formed may slightly change their mutual angular distances due to the occurrance of drift over long periods of time. However, this is of no significance due to the continuous recalibration carried out in accordance with the invention.

In the second case the photo diode is arranged such that one of the two separating ridges also extends approximately radially, while the other extends approximately tangentially to the path described by the sensor with respect to the mark carrier upon relative rotation. In order to process the four signals produced in this construction when a mark passes, two subtracting members are used which are connected such that their two inputs receive in each case the signals from two quadrants of the photo-sensitive surface which are opposite each other with respect to the point of intersection of the separating ridges. In such an arrangement, the signals, which are emitted by the two subtracting members when a mark passes, or their zero crossovers are displaced as to time with respect to one another if the border lines of the marks are not exactly symmetrical to the radially extending separating ridge of the photo diode. The extent of any relative displacement occurring radially between the sensor and the mark carrier can be determined from a change of the time distance between these two signals belonging respectively to one mark, and a recalibration of the system can be carried out automatically, for instance if a prescribed tolerance limit is surpassed. The occurrence of eccentricies can also be identified with this arrangement.

It is advantageously provided that a rectangular (square wave) pulse be produced for each output signal emitted by the subtracting member when a mark passes. At least one edge of this rectangular pulse is at a fixed distance as to time from the zero crossover of the output signal, and that the time distances of these edges are measured and processed further. The rectangular pulses emitted by the transmitter, comprising the sensor, the subtracting member and the buffer circuit connected downstream thereof, may be embodied for example with respect to the steepness of their edges and their amplitude such that they are suitable for triggering the ordinary commercial TTL-IC digital components, whereby the subsequent evaluating circuit can be constructed at particularly low cost. In accordance with the invention, however, other discrete or integrated circuit components may be used for further signal processing. All that is important is the strict assignment as to time of a clearly identifiable part, for instance the rising edge of the signal produced by the transmitter when a mark passes the sensor, to this mark, so that in actual fact the distance as to time of these signal parts can be used as a measure for the angular distance of the marks.

Apparatus suitable for solving the object of the invention comprises a measuring and evaluating circuit having the following components: a transmitter connected downstream of the sensor and forming the output signals thereof, an identification circuit for identifying the marks belonging to the signals emitted by the transmitter, a time measuring unit for measuring the time distances of the signals emitted by the transmitter, a control circuit triggering the measurement of the time distances of certain signals in accordance with the identification circuit, an intermediate memory for storing a multiple of time distance values, a comparison circuit for comparing the newly obtained time distance measurements with corresponding intermediately stored time distance measurements, and a calculator circuit for calculating calibrating values and the instantaneous angular velocity dependent on the comparison result.

The function and significance of these components has been dealt with already in conjunction with the description of the inventive process. It will serve here to note that these components, which substantially comprise electronic circuits, need not necessarily be present individually and in addition to one another, but may be combined in one circuit. By way of example, it is thus possible to combine the identification circuit, the control circuit and the comparison circuit with the calculation circuit in one single calculator which carries out the corresponding functions either one after the other or parallel to one another. Such calculators are available at low cost, for instance in the form of microprocessors, so that their use is in no way in conflict with the object of the invention, namely to provide an extremely accurately functioning but nevertheless low-cost angular velocity measuring apparatus or rotational speed meter.

In a preferred embodiment example of the inventive apparatus the time measuring unit comprises a quarz-controlled oscillator, a counter for counting the oscillator periods and a time-amplitude converter circuit with an analog to digital converter connected downstream thereof. The time-amplitude converter circuit is triggered by the signals emitted by the transmitter and stopped by the signals emitted by the quarz oscillator.

Since it is necessary to ensure a sequence of the individual time measurements which is correct as to time and function, the time measurements providing the approximate and precise measuring values necessary for each determination of the time distance of two sensor or transmitter signals by means of the counter counting the oscillator oscillations or pulses and the time-amplitude converter circuit, the time measuring unit further comprises an operation control which may be either arranged extra or which may be integrated in the operation control of the complete measuring system.

It is important that an operation control be provided which assumes the aforesaid functions and, if necessary, ensures in addition that the time-amplitude converter circuit is recalibrated over and again between the precision time measurements by means of the oscillator, and that the aforesaid correction values are obtained both after each precision time measurement and after each calibration measurement and are processed in the required manner.

It is possible to digitise the analog measuring and correction values emitted by the time-amplitude converter circuit in each case separately and to process them thereafter. However, it is preferably provided that they are first stored intermediately in analog form by means of sample and hold circuits, are subtracted from one another by a differential amplifier and are only then passed on to an analog to digital converter.

As already mentioned, the inventive process permits the use of ideal marks, i.e. marks which are practically punctiform as to time, which are abstracted from the real marks present on the mark carrier, instead of these real marks, and to measure their time distances and to process them further. The direct consequence of this is that it is no longer necessary, in contrast to the prior art, to make particular demands on the geometric shape of the marks. In particular, the marks need no longer be so extremely narrowly embodied in the direction of rotation as heretofore. Instead, it is preferred that the marks on the mark carrier be stripes which differ with respect to their optical properties from the adjacent portions of the mark carrier and which extend substantially perpendicular to the direction of the relative rotation between the mark carrier and the sensing unit. In this case electric signals result which can be processed particularly well if the width of each mark stripe is larger than the width of the separating ridge and smaller than the width of the differential photo diode. The striped embodiment of the marks leads to a substantially improved signal to noise ratio at the sensor output since a much stronger optical contrast can be achieved between the marks and the adjacent portions of the mark carrier due to the larger width of the marks.

The sensing of the mark carrier can be carried out either in accordance with the reflected light method or the transmitted light method. It must be ensured in each case that the measuring light beam emitted from the light source impinges the surface of the mark carrier as perpendicularly as possible, and this results in the case of the refelcted light method in that the reflected light returns along the path of the impinging light. Since light source and light receiver cannot be arranged in the same position, a beam splitter, for instance a semipermeable mirror, is used for decoupling the reflected light.

In order to achieve as favourable an illumination of the photo receiver forming the sensor as possible, it is appropriate to arrange the light exit opening of the illumination arrangement as near to the mark carrier as possible. This may be carried out by arranging the light source, possibly using an image or condenser lens, as near to the mark carrier as possible. In cases where this is not possible due to the amount of space available, for instance, it is preferred that a fibre-optic light guide is provided which guides the light of the light source into the direct vicinity of the mark carrier. In addition, this light guide can be advantageously used for homogenising the light emitted by the light source. Not only filament bulbs but also the light emitting diodes (LEDs or laser diodes), which are preferably used as light source, having a structure which leads to the fact that the light is rather emitted from a surface area than from a surface point, the individual points of the surface area shining with different degrss of brightness. The light guide arranged between light source and mark carrier is capable of carrying out a condenser function in this case, i.e. its front side facing towards the mark carrier appears as a substantially homogeneously shining surface, by means of which the photo sensitive surface of the photo diode forming the sensor can be evenly illuminated.

Since in accordance with the invention no particular care need be taken when disposing the marks on the mark carrier, the shape of the mark carrier itself can be adapted within wide limits to the particular application in question. Thus a disc shape similar to the known mark carriers is just as possible as the use of cylindrical mark carriers. For example, if the angular velocity or speed of rotation of a rotating shaft is to be measured and monitored, the marks may also be disposed directly on the shaft itself. In this case, the rotating member is identical to the mark carrier.

BRIEF DESCRIPTION OF THE DRAWINGS

The invention will now be described in the following by means of an embodiment example and with the reference to the drawing, in which.

DESCRIPTION OF THE PREFERRED EMBODIMENT

Figure 1:
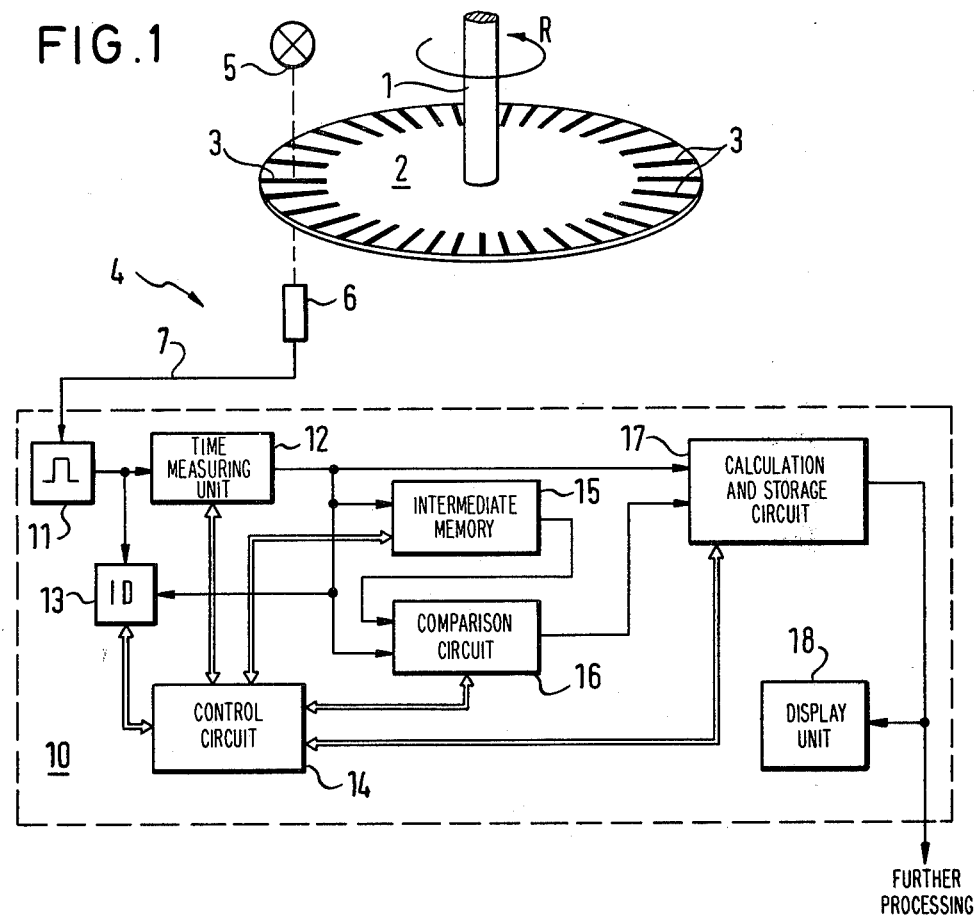
FIG. 1 is a schematic illustration of an inventive measuring apparatus.

Referring first to FIG. 1, a rotating member, such as a shaft, whose angular velocity or speed of rotation is to be measured and monitored has a scale disc carrier 2 attached to it such that it rotates along with the shaft 1 and the mutual axis of rotation extends through the center of both shaft and disc.

On one of the flat sides of the circular scale disc 2 there is arranged a plurality of mark stripes 3, which are spaced apart in the direction of rotation along the periphery and which have a different degree of light permeability than the remaining portions of the mark carrier surrounding them. No particular requirements are needed for the accuracy either of the division of the scale formed by these mark stripes 3 on the disc 2 nor of the geometric shape of the individual mark stripes.

For measuring the angular velocity, a fixed sensing device generally depicted by the numeral 4, i.e. which does not rotate with the shaft 1, is provided which comprises a light source 5 and a sensor 6 arranged on opposite sides of the scale disc 2 such that the line connecting them is approximately perpendicular to the surface of the scale disc 2.

Due to the rotation of the shaft 1 in the direction of the arrow R, light-impermeable marks 3 and light-permeable spaces between the marks thus run alternately through the measuring light beam from the source 5 which is thus modulated.

A light emitting diode is preferably used as light source 5. This diode can be either a LED or a laser diode.

The sensor 6 is an opto-electric sensor passing an electric signal via the line 7 to a measuring and evaluating circuit 10 each time a mark 3 passes it. The time distance of these signals, which is to be measured and further processed in each case by the measuring and evaluating circuit 10, depends both on the angular distance of the respective marks 3 and on the instantaneous angular velocity or speed of rotation of the rotating shaft 1.

The measuring and evaluating circuit 10 comprises a transmitter 11 as an input member connected to the line 7 which not only serves to form the sensor signals but also to obtain ideal signals, i.e. signals which are practically punctiform as to time, from the real marks disposed on the scale disc 2. The time distances of these ideal signals can then be very accurately measured by the time measuring unit 12 connected downstream of the transmitter 11.

The measuring and evaluating circuit 10 further comprises an identification circuit 13 which identifies the mark that passes the sensor at any given time. This identification can be carried out by means of the time distance measured for the directly preceeding pair of marks or by means of the quotient of the time distances of the immediately preceeding pairs of marks and/or by counting the pulse signals coming directly from the transmitter 11. The identification circuit 13 passes a date individualising the respective mark to a control circuit 14 which, in accordance with a predetermined program, centrally controls the function sequence in the complete measuring and evaluating circuit. Since it also has to receive data concerning the respective operational state of the remaining circuit components in order to carry out this control properly, it is connected to the latter by means of transmission lines operating in both directions. This is symbolised in FIG. 1 by double lines provided with arrows at both ends.

Among other things, an intermediate memory 15 is connected downstream of the time measuring unit 12. The intermediate memory 15, in the shown embodiment serves to store the time distances (which are measured one after the other by the time measuring unit 12 during a complete revolution of the scale disc 2 and which form a complete series of measurements) of all marks directly following one another or of the transmitter pulse signals assigned to them, at least until the respective pair of marks passes the sensor at the next revolution and the new time measuring value thereby obtained can be compared with the corresponding measuring value of the previous series of measurements, for example by quotient formation. The comparison is carried out by the comparison circuit 16 which is connected for this purpose both to the output of the time measuring unit 12 and to the output of the intermediate memory 15. The control circuit 14, with the help of the data supplied to it from the identification circuit 13, ensures that only the time distances, which are obtained from subsequent revolutions are compared with one and the same pair of marks of the preceding in each case, are compared with each other.

The result of these comparisons is forwarded to a calculation and storage circuit 17 which, depending on whether or not the values corresponding to one another coincide within predetermined limits, either stores the time distances supplied to it by the time measuring unit 12 as calibrating values which are useful for a longer period, or uses them only for calculating the instantaneous rotational speed or angular velocity which is then displayed visually by the display unit 18 and/or is passed on in the form of electric signals to further devices (not shown) for further processing.

It will be noted that the transmission of the pulse signals between the blocks of the measuring and evaluating circuit 10 shown in FIG. 1 may occur not only serially but also parallel or in a mixed form. In the latter two cases, the connections illustrated with single lines will then comprise a multiple of parallel transmission lines.

Figure 2:
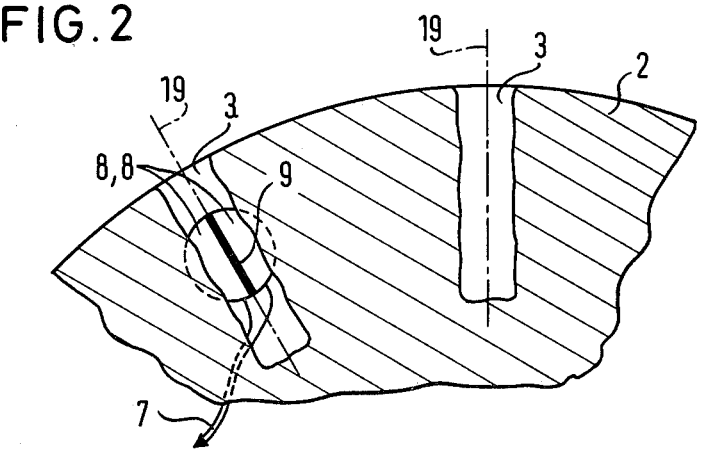
FIG. 2 is an enlarged section of a mark carrier.

FIG. 2 shows a section of a scale disc 2 having two marks. The large surface of the mark carrier does not transmit light and the measuring light beam emitted from the light source 5 will only reach the sensor 6 when a mark 3 passes the sensor. In accordance with FIG. 2 this sensor basically comprises a differential photo diode, the photosensitive surfaces 8, 8 of which are separated from each other by a narrow ridge 9. As is clear from FIG. 2, it is not important that the mark stripes 3 should have a particularly well defined geometric shape, since an ideal mark or signal is abstracted from them in each case by means of the differential photo diode 8, 8 and the transmitter 11 described in detail hereinafter with reference to FIG. 3. This ideal mark is indicated in FIG. 2 by means of a dot-dash line. Two mutually insulated lead wires 7 extend from the differential photo diode. As seen from FIG. 3, these wires 7 are, on the one hand, each connected to the two inputs of a differential amplifier 20 and, on the other hand, to ground via load resistors 21 respectively.

In a particularly preferred embodiment provision is made for an amplifier (not shown in FIG. 3) having a high amplification factor to be joined in circuit in each of the lines leading from the photo-sensitive surfaces 8, 8 of the differential photo diode to each of the inputs of the differential amplifier 20, in order to pre-amplify the signals emitted by the photo-sensitive surfaces of the photo diode before their subtraction in the differential amplifier 20. In this manner the output signal of the differential amplifier 20 shown as wave form C in FIG. 4 in the third line from the top has a very steep zero crossover which is thus exactly fixed as to time and precisely detectable.

The output C of the differential amplifier 20 is, for the purpose of direct-voltage decoupling, connected across a capacitor 22 to the negative input of a comparator 25 which input is connected via a resistor 23 to ground. The positive input of the comparator 25 is connected through a resistor 26 to an adjustable potential source which is illustrated as a potentiometer 27, for the sake of simplicity, and which provides the necessary reference potential for identifying the zero crossover of the output signal delivered by the differential amplifier 20. The output of the comparator 25 is, on the one hand, connected to the input of the first of two inverters 29 serving as buffers, and, on the other hand, is fed back to the positive input of the comparator 25 through a capacitor 28 for producing a defined hysteresis. The inverters 29 may, by way of example, comprise TTL components which serve to form the signal emitted by the comparator 25 in such a manner that it can be fed without any problem into the circuit units connected downstream thereof.

Figure 3:
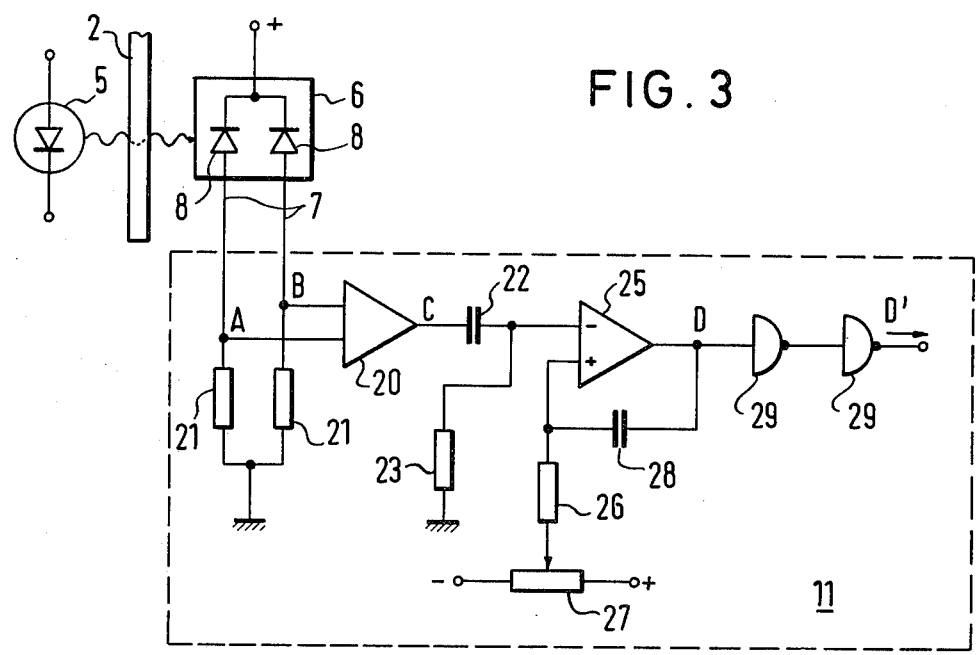
FIG. 3 is a circuit diagram of the sensing device and of a transmitter connected downstream of the sensor of this sensing device.

The mode of operation of the transmitter illustrated in FIG. 3 will now be explained with reference to FIG. 4 in which the signals, which appear at the points A to D' of the transmitter circuit 11 when a series of marks passes the sensor 6, are reproduced along a time axis.

Each time the measuring light beam is interrupted by a mark 3 or, in accordance with the embodiment example shown in FIG. 2, is allowed through, a half-wave occurs at the points A and B. The signal at the point B is displaced in time with respect to the signal at the point A since the differential photo diode 8, 8 is arranged in such a manner that its separating ridge 9 extends approximately in the radial direction with respect to the axis of rotation of the scale disc 2, so that at first one and then the other of the two photo-sensitive surfaces of the diode is brushed over by the mark 3.

Figure 4:
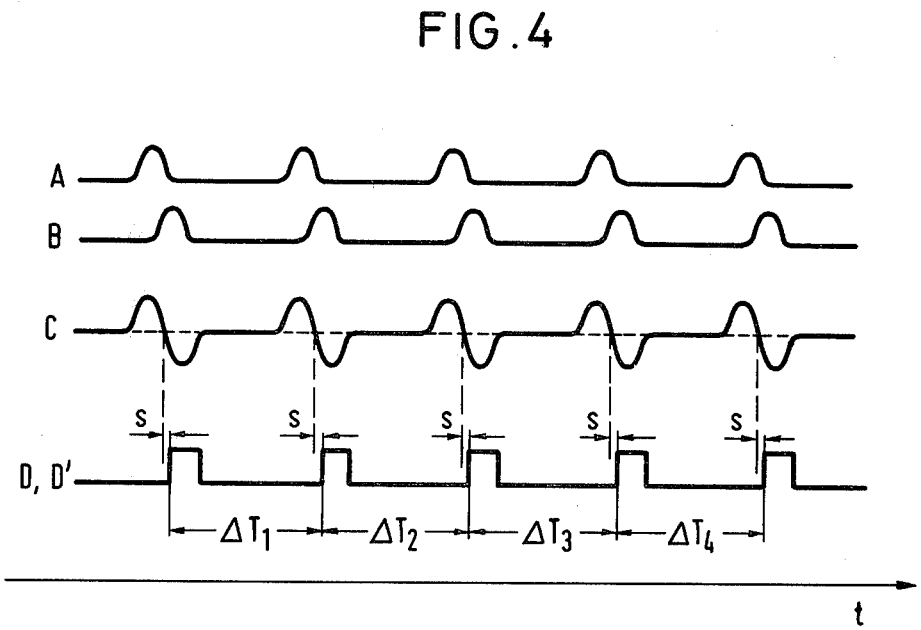
FIG. 4 is a diagram illustrating the electric signals occurring at different points of this transmitter.

The differential amplifier 20 produces the signal C from the half-waves occurring at the points A and B, and the signal C has the steep zero crossover forming an ideal mark illustrated in FIG. 4, when the peripheral width of the marks 3 is larger than the width of the separating ridge 9 and smaller than the diameter of the differential photo diode 8, 8.

The crossover of the signals C is identified by means of the comparator 25 which is given an appropriate reference level by means of the potential source 27. The rectangular pulse signals D appear at the output of the comparator 25, and their rising edges are very steep and stand in an unambiguous time relationship with the zero crossovers of the signals C. The time delays s occurring between each such zero crossover and the corresponding rising edge of the pulse is highly exaggerated in FIGS. 4 and 6. In actual fact, it is so small that any short-term variation of this delay will not affect the accuracy of the measurement result. Since the same is true for the signal delays occurring at the buffer inverters 29, the signal D' occurring at the output of the second of the inverters 29 can be set equal to the signal D at the output of the comparator 25. The rising edges of the rectangular pulses D' thus represent ideal marks which clearly and, at least for a short period, reproducibly correspond to the optical centroidal axes 19 of the mark stripes 3. The time intervals $\Delta T\nu$ of these ideal marks are, at a given angular velocity of the mark carrier, an exact measure for the absolute values of the angular distances of these optical centroidal axes. If, conversely, these absolute angular distances are known, the instantaneous angular velocity can be calculated very accurately from the values $\Delta T\nu$.

Figure 5:
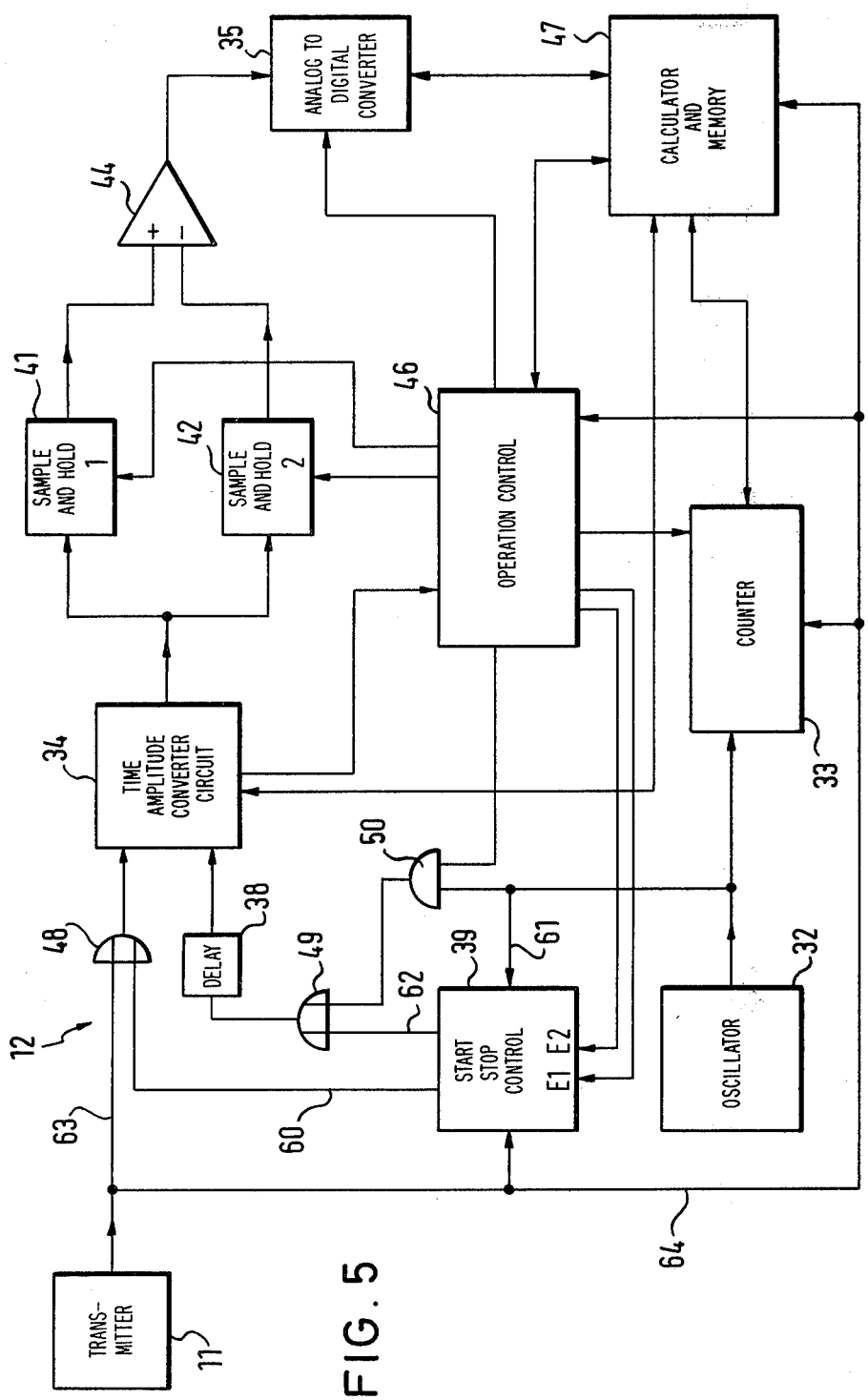
FIG. 5 is a schematic block diagram of a preferred time measuring device.

A preferred time measuring unit 12 for the highly accurate measurement of the time intervals $\Delta T\nu$ is illustrated schematically in FIG. 5. It is based on the principle that, on the one hand, the oscillation periods of a free-running, quarz-controlled oscillator 32 are counted by means of a counter 33 for determining approximate time values. In this case the frequency of the quarz oscillator 32 emitting, for instance a rectangular signal is selected such that it, even with the maximum rotational speed of the shaft 1, produces a sufficient number of oscillation periods or output pulses during each period of time $\Delta T\nu$ to be measured, i.e. in the time which elapses between the passing of two random succeeding marks 3 at the sensor 6. If this frequency is $F_O$, it follows for a time distance $\Delta T$, within which the counter 33 counts m oscillator periods, as a first approximation $$\Delta T_G = m(1/F_O)$$

(G=approximate measuring value), or, if $\phi = 1/F_O$ is the length as to time of a quarz period $$\Delta T_G = m\phi.$$

Without additional meaasures, $\Delta T\nu$ could thus only be measured in integral multiples of the time unit $\phi$, which in the case of high rotational speeds, i.e. very small $\Delta T\nu$, would require an extremely high quarz frequency $F_O$ for achieving a high measuring accuracy.

Therefore, to obtain precise time measuring values, a so-called time-amplitude converter circuit 34 is provided which substantially comprises a capacitor which, upon being triggered by a START signal is charged by means of a constant current source so that the voltage appearing at it increases linearly in time after a short initial phase until the charging operation is stopped by a STOP signal. The amplitude of the signal appearing after the STOP signal at the output of this time-amplitude converter circuit is thus a measure for the period of time elapsing between the START and the STOP signal.

With the time measuring unit 12 of FIG. 5, the time-amplitude converter circuit 34 is applied such that it is started by the transmitter 11 by means of the signal coming from an OR gate 48 and is stopped by the next subsequent rising edge of an oscillator pulse. This STOP signal is fed to it under the control of the operation control 46 via an AND gate 50, serving to suppress the oscillator pulses not required, via an OR gate 49 and a delay member 38 the function of which will be explained in more detail hereinafter.

The time-amplitude converter circuit 34 thus measures with high accuracy and for each transmitter signal the time which elapses between the appearance of the rising edge of this transmitter signal and the next rising edge of a pulse of the free-running oscillator, said time being extended by a constant value $\tau$ prescribed by the delay member 38. If these precision time measuring values for the two transmitter signals, which define the total time distance $\Delta T$ to be measured, are indicated with $\Delta T_1$ (for the earlier signal as to time) and $\alpha t_2$ (for the later signal as to time), and if the counter 33 determines that m oscillator oscillations have occurred between the rising edge of the oscillator pulse, which immediately follows the earlier transmitter signal, and the rising oscillator pulse edge, which immediately follows the later transmitter signal, it follows that $$\Delta T = \Delta t_1 + m\frac{1}{F_0} - \Delta t_2$$

$$= \Delta T_G + \Delta t_1 - \Delta t_2$$

Since the counter 33 provides the count m in digitised form, it is appropriate to also digitise the analog output signal amplitudes of the time-amplitude converter circuit 34, and this is carried out by means of the analog to digital converter 35.

The calculation of the time distance measuring values $\Delta T$, which is carried out in accordance with the above equation, is performed by the calculator 47 which, apart from the necessary circuits, also comprises a memory.

The operation control 46, which may be constructed as a Johnson counter, for instance, carries out, apart from the above-mentioned control of the AND gate 50, a whole series of further functions which will be explained in conjunction with the description of the remaining components of the time measuring unit 12, in as far as they are of significance.

Of the remaining components of the time measuring unit 12, the START-STOP control 39 is to be mentioned first. This START-STOP control can give START and STOP signals through the OR gates 48 and 49 respectively to the corresponding inputs of the time-amplitude converter circuit 34. Fundamentally, one can differentiate between two different functioning types, depending on whether the time-amplitude converter circuit 34 is to be recalibrated with the help of these internally produced START-STOP signals by comparing them with the frequency standard formed by the quarz-controlled oscillator 32, or whether a correcting value is to be produced in order to eliminate transit time differences and non-linearities.

In the first case the START-STOP control 39 receives a command signal from the operation control 46, for instance via the input E1, in which case it first of all emits a START signal via the line 60, and this signal is exactly in synchronism with the oscillation fed to it from the oscillator via the line 61, e.g. it may coincide for instance exactly with the falling edge of a rectangular pulse emitted by the quarz-controlled oscillator 32. For example, a half period of the oscillator later, i.e. at the next rising edge of a pulse, the control 39 delivers a STOP signal via the line 62, so that it is possible to compare the amplitude value of the output signal of the time-amplitude converter circuit 34, produced in the meantime, with the very accurate and constant oscillation of the quarz oscillator. This comparison may also be carried out with several half or complete periods. Moreover, it is possible to vary the number of oscillator periods used from one calibrating measurement to the next, so that a complete calibration scale results for the output amplitudes of the time-amplitude converter circuit 34.

In the second case the operation control 46 delivers a command signal to the input E2 of the START-STOP control 39, whereby the latter is caused to emit a START and STOP signal exactly simultaneously on the lines 60 and 62 respectively. Since, due to the delay member 38, the STOP signal arrives at the time-amplitude converter circuit 34 with a time lag $\tau$, the time-amplitude converter circuit 34 produces an output signal corresponding to this length of time $\tau$. Since the time $\tau$ is selected so as to be somewhat longer than the initial period in which the output signal of the time-amplitude converter circuit increases non-linearly, the output signal thus obtained represents a correction value which is suitable for eliminating the influence of this nonlinearity from a measuring or calibrating value obtained just previously. Transit time differences are also covered by this correcting value. Such transit time differences may be present due to parasitic effects between the signal path conveying the START signal to the time-amplitude converter circuit and the corresponding STOP signal path.

Each of these measuring values A was obtained such that the time-amplitude converting circuit 34 was in operation not only during the period to be measured $\Delta t$ but also during the additional period $\tau$. If this period $\tau$ was also added at the end to the particular measuring time in question $\Delta t + \tau$, then, because of the particular selection of $\tau$, each measuring or calibrating value A contains at the output of the time-amplitude converter circuit 34 a portion $\alpha$, which was obtained during the first $\tau$ time units and which is basically non-linear, and a portion $\Delta A$ which was subsequently obtained and which is exactly proportional to the period $\Delta t$, which is the period that is of interest here:

$$A = \alpha + \Delta A$$

in which case the size of these two portions is initially unknown. For this reason, under the control of the operation control 46, the value A, which may be either a time distance value or a calibrating value, is first stored in a first sample and hold circuit 41. Immediately thereafter, the time-amplitude converter circuit 34 is reset to its initial state and a command signal is given from the operation control 46 to the input E2 of the START-STOP control 39, which simultaneously emits a START and STOP signal via the lines 60 and 62 in the manner described above, whereby the time-amplitude converter circuit 34 is caused to produce exactly this fundamentally non-linear portion $\alpha$ belonging to the above equation, for the duration of the period $\tau$. This portion $\alpha$ is then taken over under the control of the operation control 46 by a second sample and hold circuit 42, after which a differential amplifier 44 can calculate in accordance with $$A - \alpha = \Delta A$$

the value $\Delta A$ which is exactly proportional to the period $\Delta t$ that is of interest here, and pass it on to the analog to digital converter 35.

Figure 6:
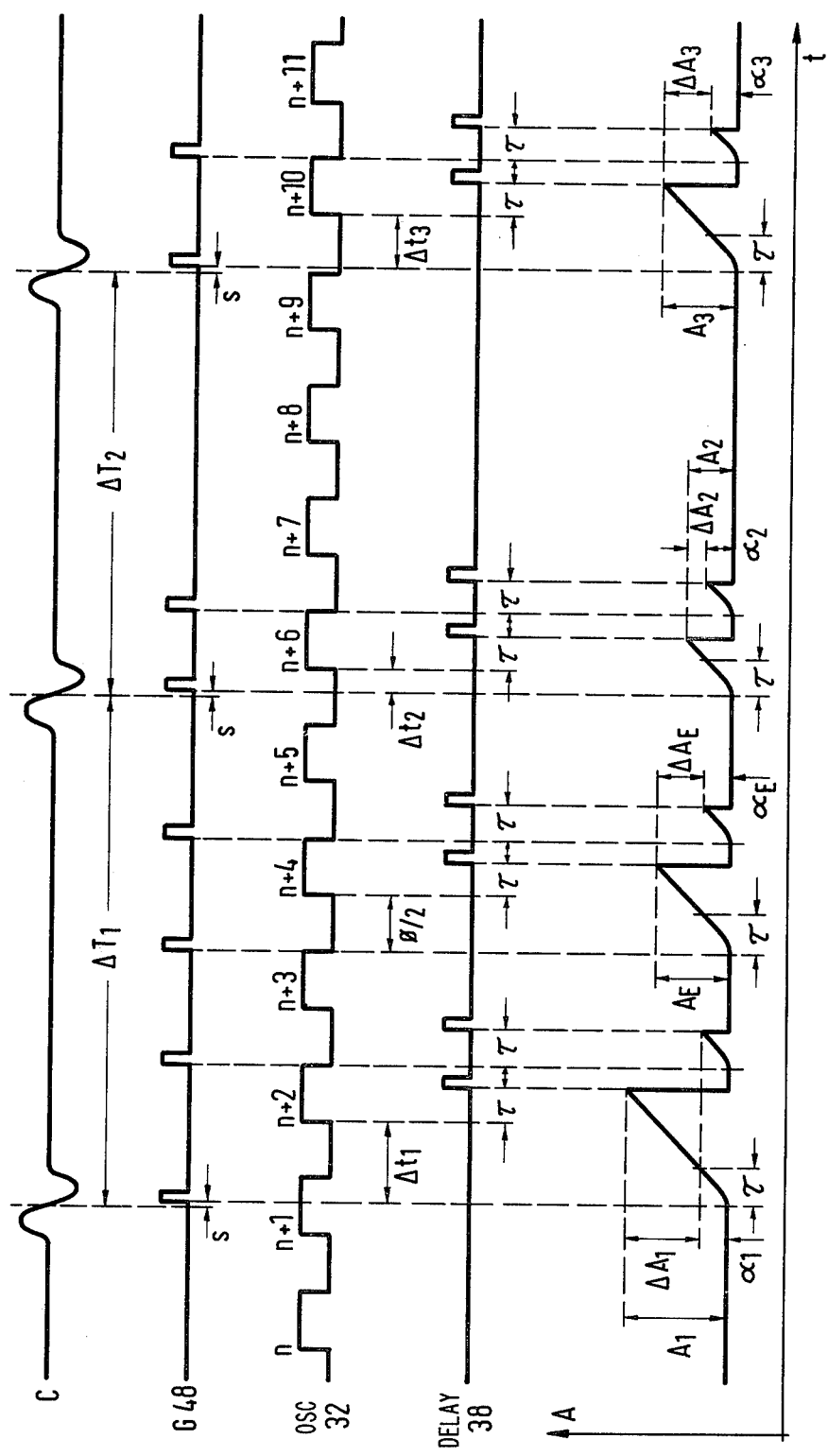
FIG. 6 is a signal diagram illustrating the mode of operation of this time measuring device.

A summary illustration of these operations is again shown in FIG. 6 in the form of a signal diagram.

Three signals are illustrated in the top line C as they are produced in the transmitter 11 at the point C when three marks pass the sensor 6 one after the other. The zero crossovers of the three signals C represent the ideal marks abstracted from the real marks, the time distances $\Delta T_1$ and $\Delta T_2$ of which ideal marks are to be measured.

The second line in FIG. 6 shows the pulses appearing at the output of the OR gate 48. These are first of all the three pulses respectively assigned to the signals C and which arrive from the transmitter 11 via the line 63 at the gate 48 and which are passed on from the latter. The rising edges of these pulses are delayed by s with respect to the zero crossovers of the signals C, but this delay is-in contrast to what is shown in the Figure-extremely small and plays no part even in the case of the very high measuring accuracy aimed at since it can be taken to be constant for the short times $\Delta T_1$ and $\Delta T_2$, respectively.

To determine $\Delta T_1$ and $\Delta T_2$ it is thus possible to measure without error the time distances of the rising edges of the pulses in question at the output of the gate 48.

Since these pulses originally passed to the gate 48 from the transmitter 11 via the line 64 also arrive at the counter 35 and the operation control 46, the count achieved after the first of these three pulses can be read out of the counter 33.

In accordance with FIG. 6, in the third line from the top of which the rectangular pulses of the oscillator 32 are illustrated, this is the count $n+2$.

In the corresponding manner, the count $n+6$ is read out of the counter 33 after the second transmitter pulse and the count $n+10$ is read out of the counter 33 after the third transmitter pulse.

Thus, the appropriate measuring values $$\Delta T_{1G} = [(n + 6) - (n + 2)] \phi = \\ = 4\phi \\ \Delta T_{2G} = [(n + 10) - (n + 6)] \phi = \\ = 4\phi$$

are obtained for the time distances $\Delta T_1$ and $\Delta T_2$.

It will be noted that, because it is assumed here, that only a few oscillator pulses occur between the individual transmitter pulses, these approximate measuring values are not suitable for showing the difference existing between $\Delta T_1$ and $\Delta T_2$.

For this reason, the time-amplitude converter circuit 34 is started simultaneously with the rising edges of each of the output pulses of the gate 48, each corresponding to a transmitter signal. The output signal of the time-amplitude converter circuit 34 increases, as shown in the bottom line of FIG. 6, at first non-linearily and then, at the latest after the elapse of the period $\tau$, exactly proportional to the time.

The rising edges of the pulses of the oscillator 32, which immediately follow the respective rising edges of the pulses at the output of the gate 48 coming from the transmitter 11, are indicated in FIG. 6 with the counts $n+2$, $n+6$ and $n+10$. These pulses from the oscillator 32 have the time distances $\Delta t_1$, $\Delta t_2$ and $\Delta t_3$ from the other pulses deriving from the transmitter 11, and these time distances are of interest as precision time values. These rising edges of the pulses of the oscillator 32 are passed through the gates 50 and 49 to the delay member 38 which, as shown in FIG. 6 in the second line from the bottom, gives a STOP command with the predetermined time delay $\tau$ on to the time-amplitude converter circuit 34.

Thus, at the output of the time-amplitude converter circuit, the amplitudes $A_1$, $A_2$ and $A_3$ are available for the periods $\Delta t_1 + \tau$, $\Delta t_2 + \tau$ and $\Delta t_3 + \tau$. These amplitudes $A_1$, $A_2$ and $A_3$ are read into the previously reset first sample and hold circuit 41. At the same time, the time-amplitude converter circuit 34 is set back to its initial level.

Upon each of the subsequent falling edges of the oscillator pulses, the START-STOP control, which is activated through its input E2 by the operation control 46, simultaneously produces a START and a STOP pulse.

The START pulse appears at the output of the gate 48, practically without delay, as is illustrated in line 2 of FIG. 6, and it causes the renewed rising of the output signal of the time-amplitude converter circuit 34 illustrated in FIG. 6 in the bottom line.

The STOP pulse passes through the delay circuit 38 and appears with a time lag $\tau$ at the output thereof. Hence the time-amplitude converter circuit is again put into operation for the period $\tau$ after each measurement recording, and this leads to the correction values $\alpha_1$, $\alpha_2$ and $\alpha_3$ also shown in FIG. 6 in the bottom line.

These correction values are each read into the second sample and hold circuit 42 and subtracted by the differential amplifier 44 from the respective values $A_1$, $A_2$ and $A_3$ contained in the first sample and hold circuit, so that, in accordance with the equations $$A_1 - \alpha_1 = \Delta A_1$$

$$A_2 - \alpha_2 = \Delta A_2$$

$$A_3 - \alpha_3 = \Delta A_3$$

the amplitude values, which are exactly proportional to the precision time values $\Delta t_1$, $\Delta t_2$ and $\Delta t_3$, are read into the analog to digital converter 35.

From this the calculator and memory 47 can determine the precision time values and calculate the unknown time distances $\Delta T_1$ and $\Delta T_2$ in accordance with the equations $$\Delta T_1 = \Delta T_{1G} + \Delta t_1 - \Delta t_2$$

$$\Delta T_2 = \Delta T_{2G} + \Delta t_2 - \Delta t_3$$

It will be noted that the mark pair time distances $\Delta T_1$, $\Delta T_2$, ..., which are obtained in this manner, can be added up for example to form mark inherent time distances without the measuring errors being added up as well. For it follows from the above two equations that $$\Delta T_1 + \Delta T_2 + \ldots = \Delta T_{1G} + \Delta t_1 - \Delta t_2 + \Delta T_{2G} + \Delta t_2 - \Delta t_3 + \ldots$$

Here it can be seen that, with the exception of $\Delta t_1$, all the precision time values $\Delta t_2$, $\Delta t_3$ ..., which have errors, are dropped so that their errors cannot added up.

The START pulses, which are produced internally and which initiate measurement of the correction values $\alpha_1$, $\alpha_2$, $\alpha_3$, ..., need not necessarily be correlated as to time in the manner shown, with the falling edges of the oscillator pulses which follow immediately after the rising edges of the oscillator pulses which end the recording of the values $A_1$, $A_2$, $A_3$ .... It is only fundamental that they be produced soon enough after the respective prior measurements so that the correction value $\alpha_1$, $\alpha_2$, $\alpha_3$, ... obtained from them is a reasonable measure for the substantially non-linear portion contained in the corresponding value. Moreover, it must be ensured that correction value measurement has been completed before the next measuring value or calibrating value measurement begins.

FIG. 6 further shows a calibrating value measurement taking place in the period $\Delta T_1$ for re-calling the time-amplitude converter circuit 34 with the aid of the quarz oscillator 32.

For this purpose, the START-STOP control 39, which is triggered through the input E1 by the operation control 46, first produces a START pulse which is exactly synchronised with the output signal of the oscillator 32. In FIG. 6, this is the third pulse from the left in the line G 48.

The START-STOP control 39, emits a STOP signal through the line 62 which is just as exactly synchronised with the oscillator signal and which is delayed by a given number of half or complete periods of the oscillator. To simplify the drawing, it is assumed in FIG. 6 that the STOP pulse is produced exactly one quarz halfperiod after the START pulse. It also passes through the delay member 38 so that the time-amplitude converter circuit is stopped after the period $\phi/2 + \tau$; the output of the latter provides then a signal with the amplitude $A_E$ which, just like a normal time value, is at first placed in storage in the first sample and hold circuit 41.

Subsequently, a correction value $\alpha_E$ is produced in the same manner as described for the time values by activation of the input E2 of the START-STOP control 39, so that the differential amplifier 44 can produce the calibration value $\Delta A_E$ which is then also digitised and processed further by the calculator 47.

Since, in general, a sufficiently large number of oscillator pulses occur between subsequent transmitter pulses, it is possible within each period $\Delta T$ to recalibrate the time-amplifier converter circuit 34 in the manner described hereinbefore.

Finally, some points will be made in the following on the function of this apparatus with reference to a concrete embodiment example of an inventive apparatus.

The starting point for the following considerations is an apparatus in which the sensing device comprises a fixed sensor, while the mark carrier, which is embodied as a scale disc, rotates along with the rotating member whose number of revolutions or rotational speed is to be measured. As described hereinbefore, a plurality of marks are disposed on the scale disc which pass the electro-optical sensor one after the other due to the relative rotation between disc and sensing device, in which case the sensor produces a signal each time in the manner described hereinbefore. This signal has a zero crossover which has a very exact relationship with respect to the optical mark centroidal axis. At the output of the transmitter connected downstream of the sensor there appear rectangular pulses whose rising edges are in a defined time relationship with these zero crossovers and which can therefore be used as ideal marks whose time distances may be measured in order to determine the initially unknown absolute angular distances of the marks, or their optical centroidal axes and the variable angular velocity of the rotating member.

Initially, in the calculation and memory circuits of the measuring and evaluating circuit, absolutely no data is contained concerning the mark on scale disc on which, in order to indicate a zero mark, the angular distance, which this zero mark encloses with the mark directly preceeding it in the direction of rotation, is selected to be so large that the respective mark pair time distance will, together with the directly preceeding mark pair time distance, with certainty form the smallest quotient to be found on the mark carrier.

After the rotating member has been set in motion, the apparatus is started at any random point in time. The measuring apparatus is programmed such that it initially determines only the approximate time measuring values of the time distances of all mark pairs on the disc; in this context a pair of marks means any two marks which are directly adjacent. The quotients of any two approximate measuring values of mark pair time distances, which are obtained directly after each other, are formed for eliminating the instantaneous angular velocity. These quotients are compared with one another, one after the other, so as to determine which one is the smallest. In so doing, it is only necessary to always store one quotient if one proceeds in the manner that each newly obtained quotient is immediately deleted if it is larger or equal to the stored quotient and is stored instead of the old quotient if it is smaller than the latter.

If the most extreme case is assumed, namely that the start command for the measuring and evaluating circuit was given immediately after the zero mark passes the sensor, then the measuring and evaluating circuit does not quite require a complete revolution in order to identify the smallest quotient and a further revolution in order to identify that no smaller quotient has appeared until this smallest quotient appears again. At the end of this second revolution the measuring and evaluating circuit can thus begin, proceeding from the thus identified zero mark, to measure the mark pair time distances exactly, i.e. while forming and processing the precision time values as well in the manner described hereinbefore, in which case the time-amplitude converter circuit can be recalibrated by means of the quarz-controlled oscillator after each precision time measurement (and the subsequent correction value formation). Proceeding from the zero mark, the sensor signals are counted simultaneously for identifying the marks, so that at the end of the third revolution information concerning the total number of the marks present on the mark carrier is available to the measuring and evaluating circuit, along with a first complete series of measurements of mark pair time distances.

If, as described several times hereinbefore and in particular with reference to FIG. 6, the measurement of the mark pair time distances was carried out continuously, i.e. if the counting of the oscillator periods was started with the passing, for example of the first mark, and was then uninterruptedly continued (in which case the count following the passing of each further mark was only read out and further processed for determining the corresponding mark pair approximate value), then, if at the beginning of the fourth revolution, the first mark passes the sensor again, the measuring and evaluating circuit will then have the first mark inherent time distance which, like the mark pair time distances, is calculated from an approximate measuring value and two precision measuring values. Similarly, the mark inherent time distance results in the course of the fourth revolution for the directly subsequent second, third and following marks, so that the measuring and evaluating circuit not only receives the second series of measurements of mark pair time distances during this fourth revolution but also a complete set of mark inherent time distances. Therefore, it is now possible to check the constancy of the rotational speed of the rotating member in accordance with one of the methods described hereinbefore.

If this constancy is achieved during a revolution, which will generally occur sooner or later with certainty, the mark pair time distances obtained during this revolution can be stored as calibrating values and the velocity prevailing during this calibrating run can be calculated from the mark inherent time distances and can also be stored. The apparatus is capable of immediately identifying any changes of the number of rotations or rotational speed occuring and producing a corresponding indication, due to the fact that each mark pair time distance is compared with its corresponding calibrating value upon each subsequent revolution. All drift or variations occuring is also eliminated immediately due to the continuous re-calibration which the apparatus carries out automatically, so that a measuring accuracy and long-term constancy of the complete construction results which corresponds to the measuring accuracy and long-term constancy of a quarz-controlled oscillator circuit which can be made capable in a simple manner of producing extremely good results.

What is claimed is:

1. A process for measuring the instantaeous angular velocity of a rotating member wherein the rotation of said member is translated into the relative rotation of a mark carrier, on which is disposed a scale having a plurality of marks spaced apart in the direction of rotation, and a sensing device, wherein the passing of said marks causes the emission of a series of signals each of which corresponds to one mark, comprising the steps of
   (a) rotating said mark carrier with a constant known speed in at least one calibrating run during which at least one pair of marks is identified by means of their corresponding sensed signals, and the time distance between the sensed signals of said at least one pair of identified marks is measured, calculating from said time distance at said constant speed a calibration value corresponding to the absolute value of the angular distance between said at least one pair of identified marks, and thereafter storing said calibrating value,
   (b) thereafter when said mark carrier rotates with an arbitrary speed measuring the instantaneous time distance of the sensed signals between said at least one pair of identified marks, and
   (c) calculating the instantaneous angular velocity of said mark carrier by comparing the instantaneous time distance with the stored calibrating value.

2. The process according to claim 1 wherein the marks are identified by means of asymmetries present in the scale formed by the marks on the mark carrier.

3. The process according to claim 2 wherein only one of the marks is identified by means of an asymmetry said mark serving as a zero base for the identification of the remaining marks by counting the corresponding number of sensor signals therefrom.

4. The process according to claim 3 wherein the marks are spaced at unequal angular distances from each other and the zero base mark is angularly spaced from one of its directly adjacent marks a distance substantially different from the angular distances of all other marks directly adjacent to one another.

5. The process according to claim 3 wherein the zero base mark has a length different substantially from the length of the remaining marks.

6. The process according to claim 3 wherein the zero base mark has a width substantially different from the width of the remaining marks.

7. The process according to claim 1 wherein mark pair time distances are measured and mark inherent time distances are determined, said mark pair time distances comprising two sensor signals corresponding to a mark pair formed by two different marks disposed directly after each other on the mark carrier in the direction of the relative rotation, and said mark inherent time distances being time distances between pairs of signals corresponding to one and the same mark.

8. The process according to claim 7 wherein in said calibrating run, the steps of measuring the mark pair time distances in a multiple of series of measurements carried out respectively for a multiple of mark pairs, and temporarily storing said measurements, said series of measurements beginning after one another, simultaneously determining the mark inherent time distances for a multiple of individual marks and temporarily storing the values thereof, comparing the mark pair time distances forming one measurement series individually with the corresponding mark pair time distances of the temporarily stored previous measurement series, and then, if this comparison shows a coincidence within prescribed tolerance limits, storing the mark pair time distances for a longer period as calibrating values, and calculating the mean value from the mark inherent time distances and storing said mean value as a measure for the angular velocity prevailing at this time and a signal responsive to said value is outputed for further processing.

9. The process according to claim 7 wherein in said calibrating run, the steps of determining the mark inherent time distances for a multiple of individual marks, temporarily storing said determinations and comparing said determinations with one another, simultaneously measuring the mark pair time distances for a multiple of mark pairs and temporarily storing said measurements, and that then, if the comparison of the mark inherent time distances shows a coincidence within prescribed tolerance limits, storing the mark pair time distances for a longer period as calibrating values, and simultaneously calculating the mean value from the mark inherent time distances and storing said mean value as a measure of the angular velocity prevailing at that time and the signals derived therefrom are further processed.

10. The process according to claim 8 wherein each series of measurements comprises the mark pair time distances of all mark pairs present on the mark carrier.

11. The process according to claim 9 wherein each series of measurements comprises the mark pair time distances of all mark pairs present on the mark carrier.

12. The process according to claim 10 wherein the mark inherent time distances are determined for all marks present on the mark carrier and are used for calculating the mean value.

13. The process according to claim 11 wherein the mark inherent time distances are determined for all marks present on the mark carrier and are used for calculating the mean value.

14. The process according to claim 7 wherein the determination of the mark inherent time distances is carried out by means of a measurement of the time distance between the corresponding sensor signals, independently of the measurement of the mark pair time distances.

15. The process according to claim 14 wherein, in said calibrating run, the relative rotation between the mark carrier and the sensing device is caused by the rotation of the rotating member.

16. The process according to claim 15 wherein the calibrating run is repeated for continuous recalibration.

17. The process according to claim 16 including the step of measuring at each measuring run mark pair time distances and mark inherent time distances, comparing said measurements with each other and treating said measuring run as a calibrating run when the comparison shows a coincidence with prescribed tolerance limits.

18. The process according to claim 7 wherein the sensing device comprises two sensors spaced angularly apart with respect to the axis of rotation of the relative rotation, and the mark pair time distances measured first at the one and then at the other sensor upon the passing of the same mark pair are in each case assigned to a different series of measurements beginning one after the other, and the mark inherent time distances are measured between the electric signals which are produced first at the one and then at the other sensor upon the passing of the same mark.

19. The process according to claim 18 characterized in that the two sensors are arranged diametrically opposite each other with respect to the axis of rotation of the relative rotation and that the mark pair time distances measured first at the one and then at the other sensor upon the passing of the same mark pair are evaluated for identifying precession movements and/or eccentricies of the rotational axis of the relative rotation.

20. The process according to claim 19 wherein the mark pair time distances of all mark pairs present on the mark carrier are measured such that the end point as to time of each individual measurement is identical to the starting point as to time of the immediately subsequent individual measurement.

21. The process according to claim 20 including the step of triggering a continuing time measurement by a sensor signal assigned to a randomly selected mark and the measurement value attained at any given time in the case of each subsequent sensor signal is identified and processed further without interruption of the continuing time measurement.

22. The process according to claim 21 including the step of measuring the time distance between two respective sensor signals by counting the oscillation periods of a free-running oscillator occurring between said sensor signals.

23. The process according to claim 22 wherein the oscillator is quartz-controlled.

24. The process according to claim 23 including the step of measuring the position as to time of a sensor signal within the respective oscillation period of the oscillator by means of a time-amplitude converter circuit which upon triggering by means of a start signal produces an output signal which increases in its amplitude continuously and monotonically in time and which is thus a measure for the time having elapsed since the start signal.

25. The process according to claim 24, including the steps of measuring the time distance between two sensor signals by initiating the time-amplitude converter circuit by the earlier sensor signal, by stopping the time-amplitude converter circuit by a subsequently following zero crossover of the oscillator oscillation and by resetting the time-amplitude converter circuit after storage of the output signal amplitude thus obtained as a first precision time measurement, restarting the time-amplitude converter circuit by the later sensor signal, stopping the time-amplitude converter circuit by a subsequent zero crossover of the oscillator oscillation and resetting it after storage of the output signal amplitude thus obtained as a second precision time value, counting the number of oscillator oscillations occurring between the said two zero crossovers, multiplying the thus obtained count by the reciprocal value of the oscillator frequency for obtaining an approximate time value, and determining the time distance of the sensor signals by adding said first precision time value to said approximate time value and by substracting said second precision time value from their sum.

26. The process according to claim 25 wherein the first zero crossover of the oscillator oscillation occurring after the sensor signal is used for stopping said time-amplitude converter circuit.

27. The process according to claim 25 wherein the first zero crossover of the oscillator oscillation occurring after the sensor signal and in a prescribed direction is used for stopping said time-amplitude converter circuit.

28. The process according to claim 24 wherein said time-amplitude converter circuit is repeatedly recalibrated between the time distance measurements in that it is started by a zero crossover of the oscillator oscillation and stopped by a subsequent zero crossover of the oscillator oscillation, and the time measuring value of said time-amplitude converter circuit thus obtained is compared with the period of time between these two zero crossovers of the oscillator oscillation.

29. The process according to claim 27 wherein said time-amplitude converter circuit is repeatedly recalibrated between the time distance measurements in that it is started by a zero crossover of the oscillator oscillation and stopped by a subsequent zero crossover of the oscillator oscillation, and the time measuring value of said time-amplitude converter circuit thus obtained is compared with the period of time between these two zero crossovers of the oscillator oscillation.

30. The process according to claim 28 including the step of stopping said time-amplitude converter circuit by the corresponding zero crossover of the oscillator oscillation in the case of each time distance measurement and carrying out each calibrating measurement with a predetermined time delay, said time-amplitude converter circuit being started after each of these measurements by a start signal produced within the circuitry and stopped again by a stop signal which is produced simultaneously with this start signal and which is also subject to the predetermined time delay, and that the correction value thus obtained is subtracted from the previously obtained time value or calibrating value.

31. The process according to claim 29 including the step of stopping said time-amplitude converter circuit by the corresponding zero crossover of the oscillator oscillation in the case of each time distance measurement and carrying out each calibrating measurement with a predetermined time delay, said time-amplitude converter circuit being started after each of these measurements by a start signal produced within the circuitry and stopped again by a stop signal which is produced simultaneously with this start signal and which is also subject to the predetermined time delay, and that the correction value thus obtained is subtracted from the previously obtained time value or calibrating value.

32. The process according to claim 31 wherein an oscillator having a rectangular output signal is used in which case the zero crossovers of the oscillator oscillations are replaced by the crossovers of the edges of the pulse through a prescribed voltage level.

33. The process according to claim 1 wherein ideal marks are abstracted by such sensing device from the real marks disposed on the mark carrier and the time distances of said ideal marks are measured.

34. The process according to claim 33 wherein the crossover of an electric signal through a prescribed constant voltage level, said signal being derived from the signal emitted by the sensor when a mark passes it, serves as an ideal mark.

35. The process according to claim 34 wherein a differential photo receiver having at least one subtracting member connected downstream thereof is used as a sensor, and the zero crossover of the output signal produced by the subtracting member when a mark passes said differential photo receiver serves as an ideal mark.

36. The process according to claim 35 wherein a rectangular pulse is produced for each output signal emitted by the subtracting member when a mark passes said differential photo receiver, and at least one edge of said pulse is at a fixed distance as to time from the zero crossover of the output signal, and the time distances of said edges are measured and further processed.

37. Apparatus for measuring the angular velocity of a rotating member comprising a mark carrier attached to said rotating member for rotation therewith, a plurality of marks disposed on said mark carrier and spaced apart in the direction of rotation, a fixed sensing device comprising at least one sensor which senses the passing of the marks and which emits a series of signals each corresponding respectively to a mark, and further comprising a measuring and evaluating circuit, said measuring and evaluating circuit comprising a transmitter connected downstream of said sensor forming the output signals of the latter, an identification circuit identifying the marks belonging to the signals emitted by the transmitter, a time measuring unit measuring the time distances of the signals emitted by the transmitter, a control circuit which causes the measurement of the time distances of selected signals in accordance with the identification circuit, an intermediate memory storing a plurality of time distance measuring values, a comparison circuit comparing newly obtained time distance measuring values with corresponding intermediately stored time distance measuring values, and a calculation and storage circuit calculating calibrating values dependent on the comparison result and in response thereto calculating the instantaneous angular velocity.

38. The apparatus according to claim 37 wherein the sensor comprises a differential photo diode and the transmitter comprises at least one subtracting member connected to the two outputs of the differential photo diode and a comparator comparing the output signal of the subtracting member with a prescribed constant voltage level.

39. The apparatus according to claim 37 wherein said prescribed constant voltage level is a zero voltage level.

40. The apparatus according to any one of claims 37-39 wherein the time measuring unit comprises a quartz-controlled oscillator, a counter for counting the oscillator periods and a time-amplitude converter circuit having an analog to digital converter connected downstream thereof, said time-amplitude converter circuit being capable of being triggered by signals emitted by the transmitter and stopped by signals emitted by the quartz oscillator.

41. The apparatus according to claim 40 characterized in that a delay member is connected upstream of the stop input of the time-amplitude converter circuit, that the time measuring unit comprises a circuit for producing and simultaneously emitting a start and a stop signal for the time-amplitude converter circuit, and that two sample and hold circuits are connected in parallel downstream of the analog output of the time-amplitude converter circuit, the first of said sample and hold circuits being triggered for receiving and storing time values emitted by the time-amplitude converter circuit and the second of said sample and hold circuits being triggered for receiving and storing the respectively corresponding correction values emitted by the time-amplitude converter circuit due to the start and stop signals produced by the circuit arrangement.

42. The apparatus according to claim 41 wherein the output of the first sample and hold circuit is connected to the positive input and the output of the second sample and hold circuit is connected to the negative input of a differential amplifier whose output signal is fed to the analog to digital converter.

43. The apparatus according to claim 37 wherein the marks arranged on the mark carrier are stripes which differ with respect to their optical properties from the portions of the mark carrier surrounding them and which extend substantially perpendicular to the direction of the relative rotation between the mark carrier and the sensing device.

44. The apparatus according to claim 43 wherein the width of each mark stripe is larger than the width of the separating ridge of the differential photo diode and smaller than the width of the differential photo diode.

45. The apparatus according to claim 44 wherein the marks differ with respect to their light permeability from the portions of the mark carrier surrounding them and the sensing device comprises a light source arranged on the side of the mark carrier opposite the sensor.

46. The apparatus according to claim 44 wherein the marks differ with respect to their light reflecting capacity from the portions of the mark carrier surrounding them and the sensing device comprises a light source arranged on the same side of the mark carrier as the sensor.

47. The apparatus according to claim 46 wherein the light of the light source is pointed perpendicular to the surface of the mark carrier and the light reflected by the mark carrier along the path of the impinging light beam is diverted to the sensor by means of a beam splitter.

48. The apparatus according to claim 47 wherein the light source is arranged in the immediate vicinity of the mark carrier.

49. The apparatus according to claim 47 wherein a fibre-optical light guide is provided which guides the light from the light source into the immediate vicinity of the mark carrier.

50. The apparatus according to claim 45 wherein the light source is a light emitting diode.

51. The apparatus according to claim 43 wherein the mark carrier is a flat disc with approximately radially extending mark stripes.

52. The apparatus according to claim 43 wherein the mark carrier is a regular cylindrical member having stripe-shaped marks on its generating surface which extend approximately parallel to the cylinder axis.

53. The apparatus according to claim 43 wherein the sensing device comprises two sensors which are arranged diametrically opposite each other with respect to the rotational axis of the relative rotation between the mark carrier and the sensing device.

* * * * *